United States Patent
Fukushi

(10) Patent No.: US 11,493,867 B2
(45) Date of Patent: Nov. 8, 2022

(54) IMAGE FORMING SYSTEM AND WIRELESS OPERATION UNIT

(71) Applicant: CANON KABUSHIKI KAISHA, Tokyo (JP)

(72) Inventor: Kenji Fukushi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/399,958

(22) Filed: Aug. 11, 2021

(65) Prior Publication Data
US 2022/0091550 A1    Mar. 24, 2022

(30) Foreign Application Priority Data

Sep. 23, 2020  (JP) .............................. JP2020-158496

(51) Int. Cl.
*G03G 15/00*    (2006.01)
*H04N 1/00*    (2006.01)

(52) U.S. Cl.
CPC ..... *G03G 15/5016* (2013.01); *G03G 15/5012* (2013.01); *G03G 15/5062* (2013.01); *G03G 15/5075* (2013.01); *H04N 1/00411* (2013.01); *H04N 1/00413* (2013.01)

(58) Field of Classification Search
CPC ........... G03G 15/5012; G03G 15/5016; G03G 15/502; G03G 15/5062; G03G 15/5075; H04N 1/00411; H04N 1/00413
See application file for complete search history.

(56) References Cited

U.S. PATENT DOCUMENTS

| 7,667,685 | B2 * | 2/2010 | Yamada | H04N 1/00496 |
| | | | | 358/1.15 |
| 2007/0058991 | A1 * | 3/2007 | Rommelmann | G03G 21/1652 |
| | | | | 399/24 |
| 2013/0335765 | A1 | 12/2013 | Ishiguro | H04N 1/00477 |

FOREIGN PATENT DOCUMENTS

JP    2002-366287    12/2002

* cited by examiner

*Primary Examiner* — Hoang X Ngo
(74) *Attorney, Agent, or Firm* — Venable LLP

(57) ABSTRACT

Disclosed is an image forming system including: an image forming apparatus; and an operation unit communicating wirelessly with the image forming apparatus. The operation unit includes a touch panel display, a first memory temporality storing a first screen image and a second screen image related to the image forming apparatus, a second memory in which the second screen image is stored in advance. When the first screen image transmitted from the image forming apparatus to the operation unit is displayed on the touch panel display, if a first icon on the first screen image is touched, the position of the first icon is transmitted to the image forming apparatus. When the second screen image stored in the second memory is displayed on the touch panel display, if a second icon on the second screen image is touched, a command indicating the second icon is transmitted to the image forming apparatus.

20 Claims, 15 Drawing Sheets

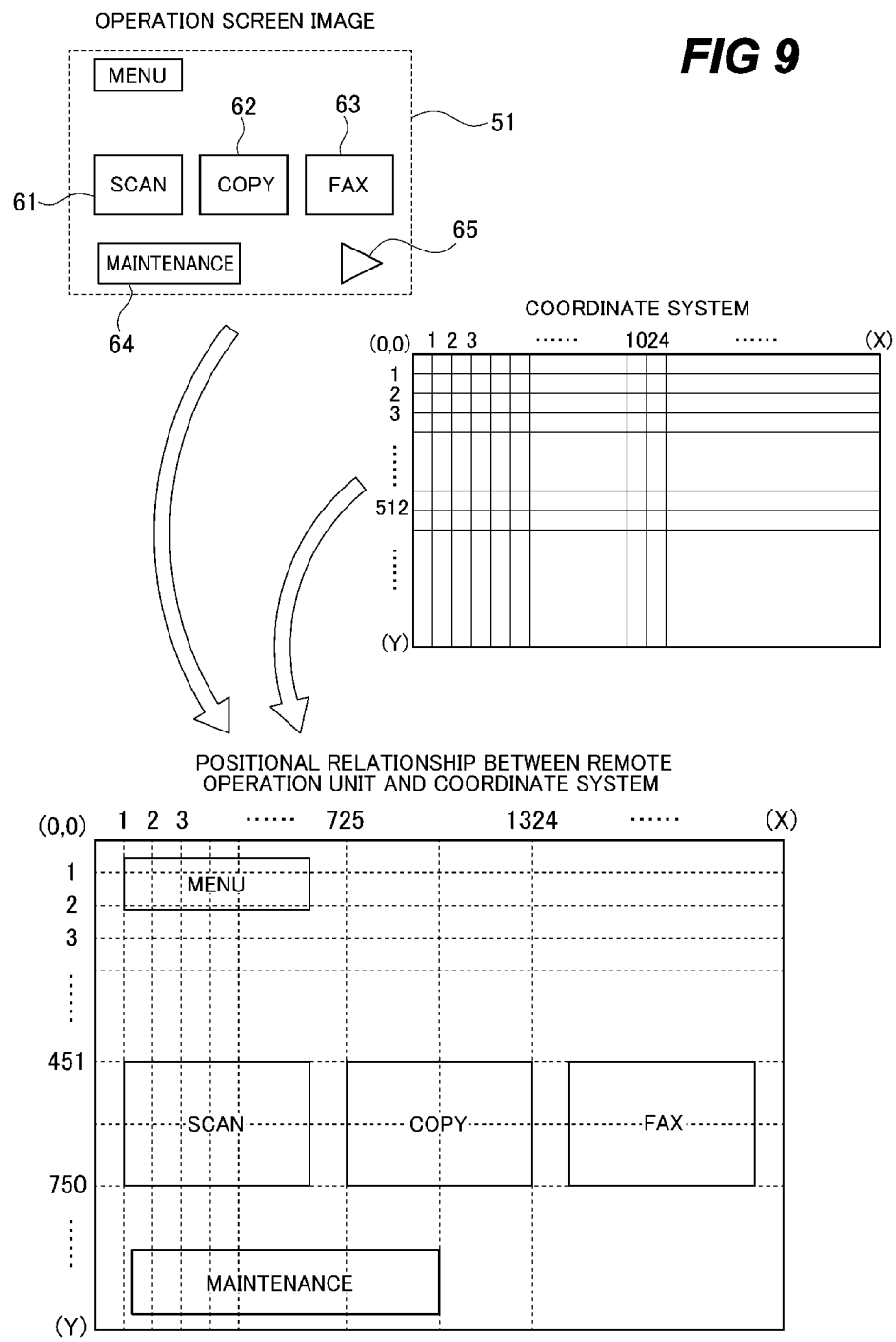

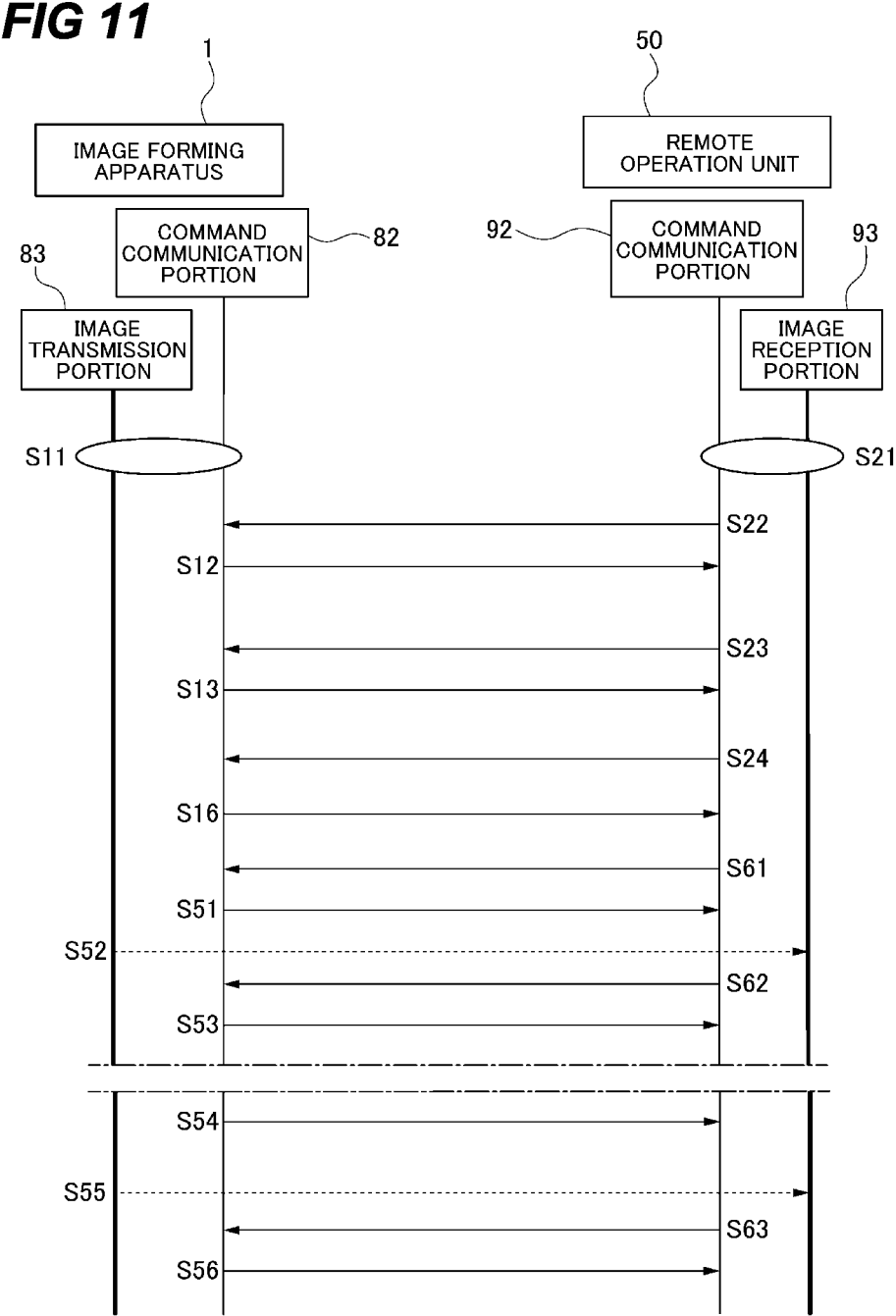

IMAGE FORMING SYSTEM AND WIRELESS OPERATION UNIT

BACKGROUND OF THE INVENTION

Field of the Invention

The present invention relates to an image forming apparatus such as an electrophotographic copy machine, an electrophotographic printer (e.g., a laser beam printer, an LED printer, etc.), and a remote operation device for the image forming apparatus.

Description of the Related Art

Conventionally, the configuration of an image forming apparatus has been widely known, which has a display portion for displaying an image, and an operation display portion with an operation portion which enables settings related to image formation, such as a sheet size and a number of images to be formed, by a user's operation of the operation portion.

Japanese Patent Application Laid-Open No. 2002-366287 discloses an image forming apparatus with an operation display device which can be detached from the image forming apparatus. This image forming apparatus further includes a remote operation portion by which information input from the operation portion by a user at a remote location from the image forming apparatus is transmitted to the image forming apparatus via wireless communication.

However, in the configuration disclosed in Japanese Patent Application Laid-Open No. 2002-366287, all images to be displayed on the display of the remote operation portion are stored in advance in the ROM that the remote operation portion has. Such a configuration may require a larger memory size of the ROM of the remote operation portion, which may increase the manufacturing cost of the remote operation portion.

SUMMARY OF THE INVENTION

One example of the present invention is an image forming system comprising:
an image forming apparatus configured to form an image on a sheet, the image forming apparatus having a first communication portion; and
a wireless operation unit configured to be able to communicate wirelessly with the first communication portion, the wireless operation unit having a touch panel display configured to be able to display an image and to receive a touch operation by a user,
wherein the wireless operation unit further includes:
  a touch position detection portion configured to detect a touch position on the touch panel display by a user;
  a first memory portion configured to be able to temporarily store data of a screen image related to an operation screen image for the image forming apparatus, the data of the screen image including data of a first screen image and data of a second screen image;
  a second memory portion in which the data of the second screen image are stored in advance; and
  a second communication portion configured to communicate wirelessly with the first communication portion,
wherein when the first screen image according to the data of the first screen image transmitted from the first communication portion to the second communication portion is displayed on the touch panel display, in response to a first icon on the first screen image being touched, position data corresponding to a position on which the first icon is displayed are transmitted from the second communication portion to the first communication portion, and
wherein when the second screen image according to the data of the second screen image stored in the second memory portion is displayed on the touch panel display, in response to a second icon on the second screen image being touched, a command corresponding to the second icon is transmitted from the second communication portion to the first communication portion.

Another example of the present invention is a wireless operation unit configured to wirelessly operate an image forming apparatus which forms an image on a sheet, the wireless operation unit comprising:
a touch panel display configured to be able to display an image and to receive a touch operation by a user;
a touch position detection portion configured to detect a touch position on the touch panel display by a user;
a memory portion in which data of a screen image related to an operation screen image for the image forming apparatus; and
a second communication portion configured to communicate wirelessly with a first communication portion of the image forming apparatus,
wherein when a first screen image according to data of the first screen image transmitted from the first communication portion to the second communication portion is displayed on the touch panel display, in response to a first icon on the first screen image being touched, position data corresponding to a position on which the first icon is displayed are transmitted from the second communication portion to the first communication portion, and
wherein when a second screen image according to data of the second screen image stored in the memory portion is displayed on the touch panel display, in response to a second icon on the second screen image being touched, a command corresponding to the second icon is transmitted from the second communication portion to the first communication portion.

Further features of the present invention will become apparent from the following description of exemplary embodiments with reference to the attached drawings.

BRIEF DESCRIPTION OF THE DRAWING

FIG. 9 is a diagram showing an example of an image displayed on the display of the remote operation unit.

FIG. 11 is a sequence chart showing communication between the image forming apparatus and the remote operation unit.

DESCRIPTION OF THE EMBODIMENTS

First Embodiment

Image Forming Apparatus

Hereinafter, the overall configuration of the image forming apparatus according to first embodiment of the present invention will be described together with image forming operations with reference to the drawings. The dimensions, materials, shapes, and relative arrangements of the components described below are not intended to limit the scope of the present invention only to them unless otherwise specified.

Figure 1:
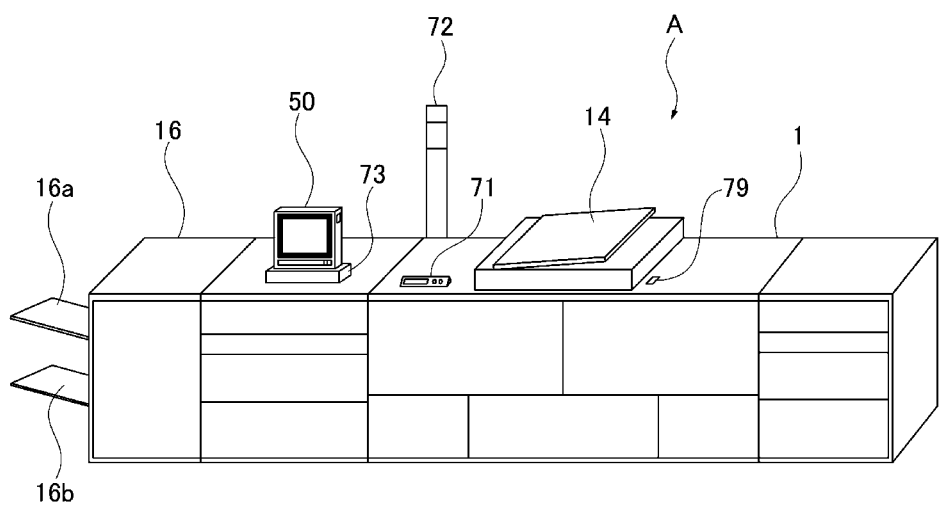
FIG. 1 is a schematic diagram showing a cross-sectional view of an image forming apparatus.

FIG. 1 is a schematic diagram showing a cross-sectional view of an image forming system A including the image forming apparatus 1. As shown in FIG. 1, the image forming system A includes an image forming apparatus 1 which forms an image on the sheet S, and the post-processing apparatus 16 which performs post-processing such as stapling, punching, and bookbinding for the sheet S on which the image has been formed by the image forming apparatus 1. At the upper portion of the image forming system 1, the reader 14 is provided which optically reads the image of a document placed on a glass surface (not shown) and converts it into image data.

The image forming apparatus 1 has the main rocker power switch 79 that switches on and off the main power. The image forming apparatus 1 further has the display panel 71 which informs a user of the statuses of the image forming apparatus 1 by displaying lamps and error codes, such as the status where image forming process is being performed, where the apparatus is being stopped due to an error, or where the apparatus is in a standby mode. The image forming apparatus 1 further has the tower-type lamp 72 which informs a user at a remote location of the statuses of the image forming apparatus 1 by turning on, turning off, or blinking the light source.

The image forming system 1 further has the remote operation unit 50 (wireless operation unit) configured to be detachably attachable to and from the panel attaching portion 73. The remote operation unit 50 is configured to perform a wireless communication with the image forming apparatus 1 at a distant location from the image forming apparatus 1. When the remote operation unit 50 is attached to the panel attaching portion 73, the charging connector 55 (see FIG. 2) of the remote operation unit 50 is connected to the power supply connector 73a (see FIG. 5) of the panel attaching portion 73. As a result, the connection of the remote operation unit 50 is detected by the image forming apparatus 1, and the battery 57 (FIG. 5) of the remote operation unit 50 is charged by the image forming apparatus 1.

Figure 2A:
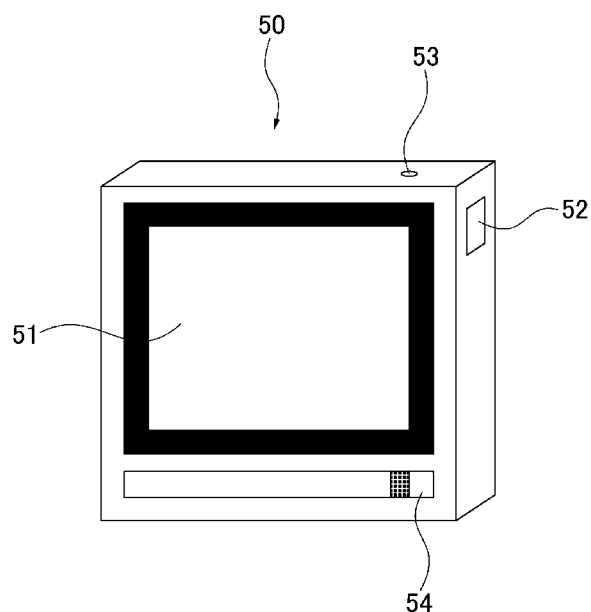
FIGS. 2A and 2B are schematic diagrams each of which shows a perspective view of a remote operation unit.
Figure 2B:
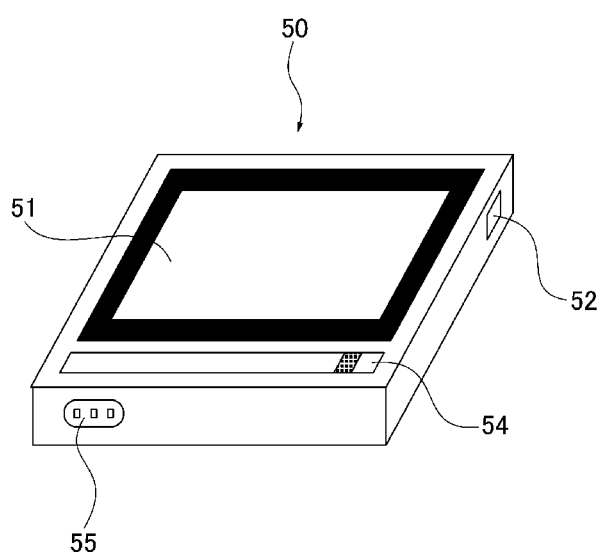

FIGS. 2A and 2B are schematic diagrams each of which shows a perspective view of the remote operation unit 50. As shown in FIGS. 2A and 2B, the remote operation unit 50 has the power switch 52 which turns the power of the remote operation unit 50 on and off, the speaker portion 53 which outputs sound, and the lighting portion 54 with LEDs and informs the statuses of the remote operation unit 50 by lighting on, turning off, and blinking the LEDs.

The remote operation unit 50 has the touch panel type display (touch panel display) 51 in which a display unit which displays an image and an operation unit with which an input of information is performed are integrated. A user makes settings related to image formation such as the number of sheets formed and the size of the sheet S, and settings related to image reading such as the size of the document by entering numerical values, etc. by touching the keys displayed on the display 51 with a finger. Although this embodiment describes the configuration in which the remote operation unit 50 has the touch panel type display 51, the present invention is not limited to this, and may also be configured to have separate hardware keys including a numeric keypad and a reset key as an operation portion for inputting information.

Figure 3:
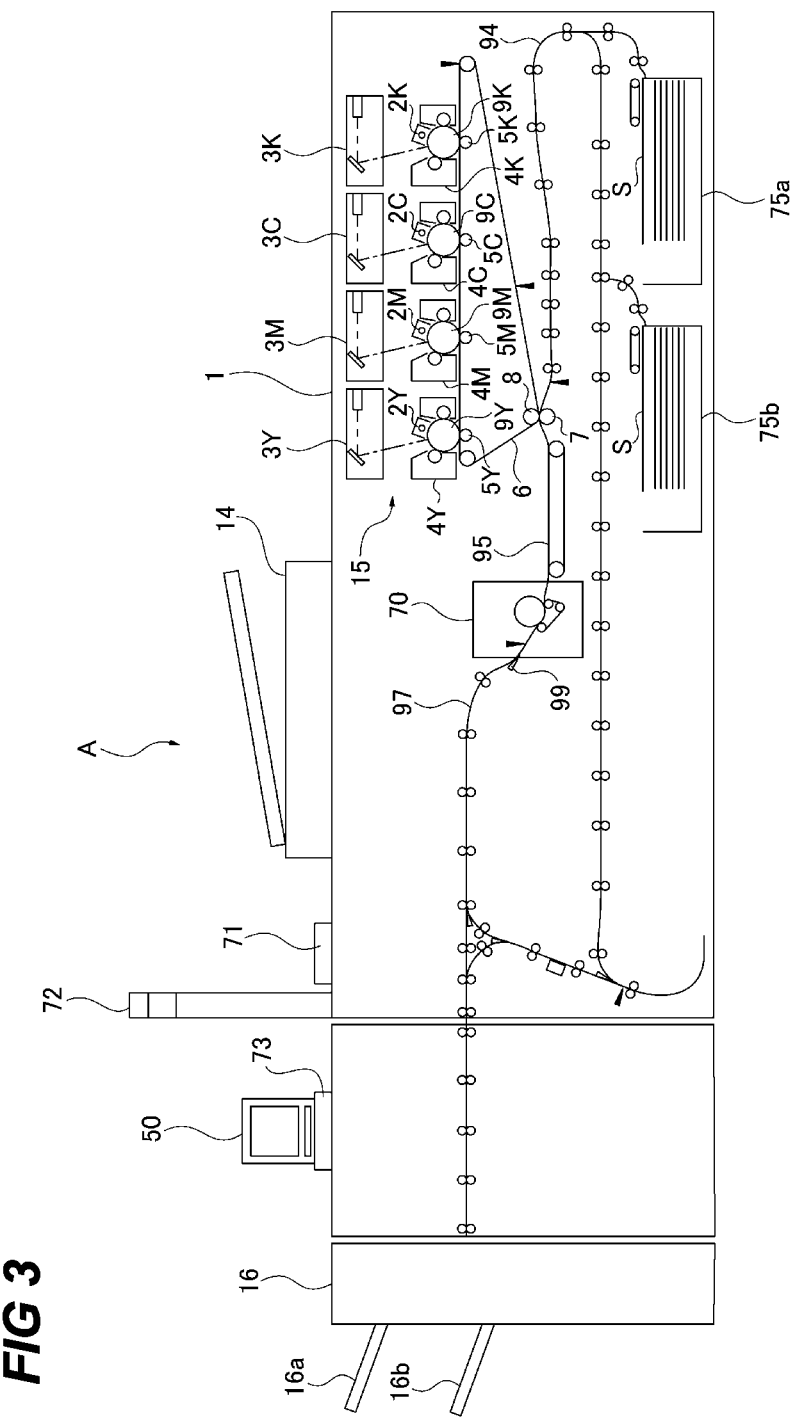
FIG. 3 is a schematic diagram showing a cross-sectional view of the image forming apparatus.

FIG. 3 is a schematic diagram showing a cross-sectional view of the image forming system A. As shown in FIG. 3, the image forming apparatus 1 has the image forming unit 15 which forms an image on the sheet S. The image forming unit 15 has the photosensitive drums 9Y, 9M, 9C, and 9K, the charging devices 2Y, 2M, 2C, and 2K, the developing devices 4Y, 4M, 4C, 4K, the primary transfer rollers 5Y, 5M, 5C, and 5K, the laser scanner unit 3, the intermediate transfer belt 6, the secondary transfer roller 7, the secondary transfer counter roller 8, and so on.

Figure 4:
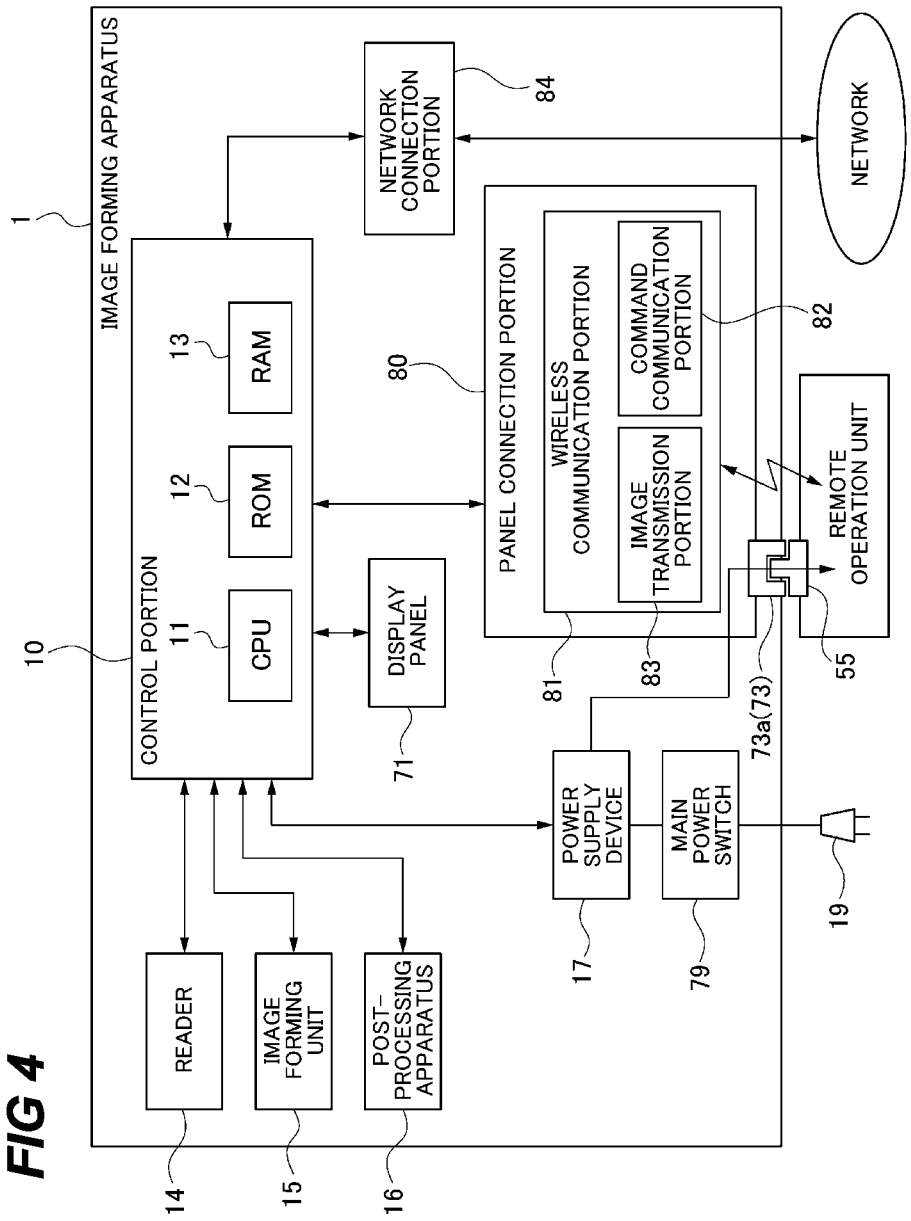
FIG. 4 is a block diagram showing the system configuration of the image forming apparatus.

When an image is formed by the image forming apparatus 1, an image forming job signal is first input to the control portion 10 shown in FIG. 4. As a result, the sheet S stored in one of the sheet cassettes 75a and 75b is sent to the conveying path 94. The sheet S is then sent through the conveying path 94 to the secondary transfer portion formed by the secondary transfer roller 7 and the secondary transfer counter roller 8.

On the other hand, in the image forming unit 15, the surface of the photosensitive drum 9Y is first charged by the charging device 2Y. After that, the laser scanner unit 3 irradiates the surface of the photosensitive drum 9Y with laser light according to the image data of the document read by the reader 14 or the image data transmitted from an external device (not shown) through a network to form an electrostatic latent image on the surface of the photosensitive drum 9Y.

Next, the developing device 4Y attaches yellow toner to the electrostatic latent image formed on the surface of the photosensitive drum 9Y to form a yellow toner image on the surface of the photosensitive drum 9Y. The toner image formed on the surface of the photosensitive drum 9Y is primarily transferred to the intermediate transfer belt 6 by applying a primary transfer bias to the primary transfer roller 5Y.

Magenta, cyan, and black toner images are respectively formed on the photosensitive drums 9M, 9C, and 9K by the same process for the yellow toner image. Then, these toner images are superimposed onto the yellow toner image on the intermediate transfer belt 6 by applying a primary transfer bias to the primary transfer rollers 5M, 5C, and 5K. As a result, a full-color toner image is formed on the surface of the intermediate transfer belt 6 according to the image signal.

The intermediate transfer belt 6 then rotates to send the full-color toner image to the secondary transfer portion. Then, a secondary transfer bias is applied to the secondary transfer roller 7 at the secondary transfer portion, and the full-color toner image on the intermediate transfer belt 6 is transferred to the sheet S. The sheet S on which the toner image has been transferred is conveyed to the fixing device 70 by the conveying belt 95 where the toner image is fixed to the sheet S by heating and pressurizing.

Next, the sheet S on which the toner image has been fixed is sent to the post-processing apparatus 16 through the discharge path 97. When the post-processing such as stapling, punching and binding has been specified by a user, the sheet S sent to the post-processing apparatus 16 is discharged to the discharge tray 16a after the specified post-processing has been performed. If the post-processing has not been specified, the sheet S sent to the post-processing apparatus 16 is discharged to the discharge tray 16b as it is without any post-processing.

System Configuration of Image Forming Apparatus

Next, the system configuration of the image forming apparatus 1 will be described.

FIG. 4 is a block diagram showing the system configuration of the image forming apparatus 1. As shown in FIG. 4, the image forming apparatus 1 has the control portion 10. The control portion 10 has the CPU 11, the ROM 12 (main memory portion, third memory portion), and the RAM 13 (auxiliary memory portion). The reader 14, the image forming unit 15, the post-processing apparatus 16, the display panel 71, the network connection portion 84 which connects an external device (not shown) via a network, and so on are connected to the control portion 10.

Various programs related to the control of the image forming apparatus 1 and various image data are stored in the ROM 12. As will be described later in detail, the ROM 12 stores in advance the data of images related to the maintenance of the image forming apparatus 1. The CPU 11 performs various arithmetic operations based on the control program stored in the ROM 12. The RAM 13 stores data temporarily. Namely, the CPU 11 performs the above-mentioned image forming operations by controlling the reader 14, the image forming portion 15, the post-processing apparatus 16, etc. connected to the control portion 10, while using the RAM 13 as a working area based on the control program stored in the ROM 12. The data stored in the ROM 12 in advance such as the data of images related to the maintenance of the image forming apparatus 1 may be stored not in the ROM 12 but in a server connected to the image forming apparatus 1 by wire or wireless. In this case, the CPU 11 temporarily moves (stores) to the RAM 13 the image data stored in the server, which are related to the maintenance of the image forming apparatus 1, and transmits the image data in the RAM 13 to the image reception portion 93 of the remote operation unit 50 via the image transmission portion 83.

Further, the panel connection portion 80 which makes a communication connection with the remote operation unit 50 is connected to the control portion 10. The panel connection portion 80 has the power supply connector 73a, the panel attaching portion 73 to which the remote operation unit 50 is connected, and the wireless communication portion (first communication portion) 81 which performs a wireless communication with the remote operation unit 50. The charging connector 55 of the remote operation unit 50 is connected to the power supply connector 73a of the panel attaching portion 73.

The wireless communication portion 81 has the command communication portion 82 and the image transmission portion 83. The CPU 11 reads the image stored in the ROM 12 and sends the image (screen image data) to the remote operation unit 50 via the image transmission portion 83 of the wireless communication portion 81. As described above, the CPU 11 reads the image temporarily stored in the RAM 13 and transmit the image (screen image data) to the remote operation unit 50 via the image transmission portion 83 of the wireless communication portion 81.

The CPU 11 generates instructions for the remote operation unit 50 and sends the instructions to the remote operation unit 50 via the command communication portion 82. The CPU 11 also receives notifications and instructions generated by the remote operation unit 50 via the command communication portion 82. Although the command communication portion 82 and the image transmission portion 83 are configured separately in this embodiment, they may be integrated using a single communication line.

In this embodiment, the single CPU 11 controls the command communication portion 82 and the image transmission portion 83, but the embodiments are not limited to this configuration. For example, the configuration may be adopted in which CPUs are provided and at least one of them controls the command communication portion 82 and the image transmission portion 83. Further, the command communication portion 82 and the image transmission portion 83 are respectively controlled by different CPUs.

In addition, the image forming apparatus 1 and the remote operation unit 50 communicate wirelessly through Wi-Fi direct communication which directly connects the devices. Miracast, a display transmission technology based on this Wi-Fi direct communication system, is used for example in cell phones, displays and projectors. The wireless communication system is not limited to the Wi-Fi direct communication, but may also be configured to use a Wi-Fi router as an access point for the wireless communication. However, for security reasons, it is preferable to use the Wi-Fi direct communication. Other wireless communication systems such as Bluetooth or NFC may be used instead of Wi-Fi.

The power supply device 17 is also connected to the control portion 10. The power supply device 17 receives power supplied from a commercial power source via the outlet plug 19, converts the power into the form used by each device, and supplies the power to each device. Specifically, when the main power supply switch 79 is switched from off-state to on-state, the power supply device 17 supplies power to the control portion 10. The power supply device 17 then supplies power to the reader 14, the image forming unit 15, the post-processing apparatus 16, the display panel 71, the remote operation unit 50 attached to the panel attaching portion 73, the wireless communication portion 81, the network connection portion 84, etc., based on the instructions of the control portion 10.

System Configuration of Remote Operation Unit

Next, the system configuration of the remote operation unit 50 will be described.

Figure 5:
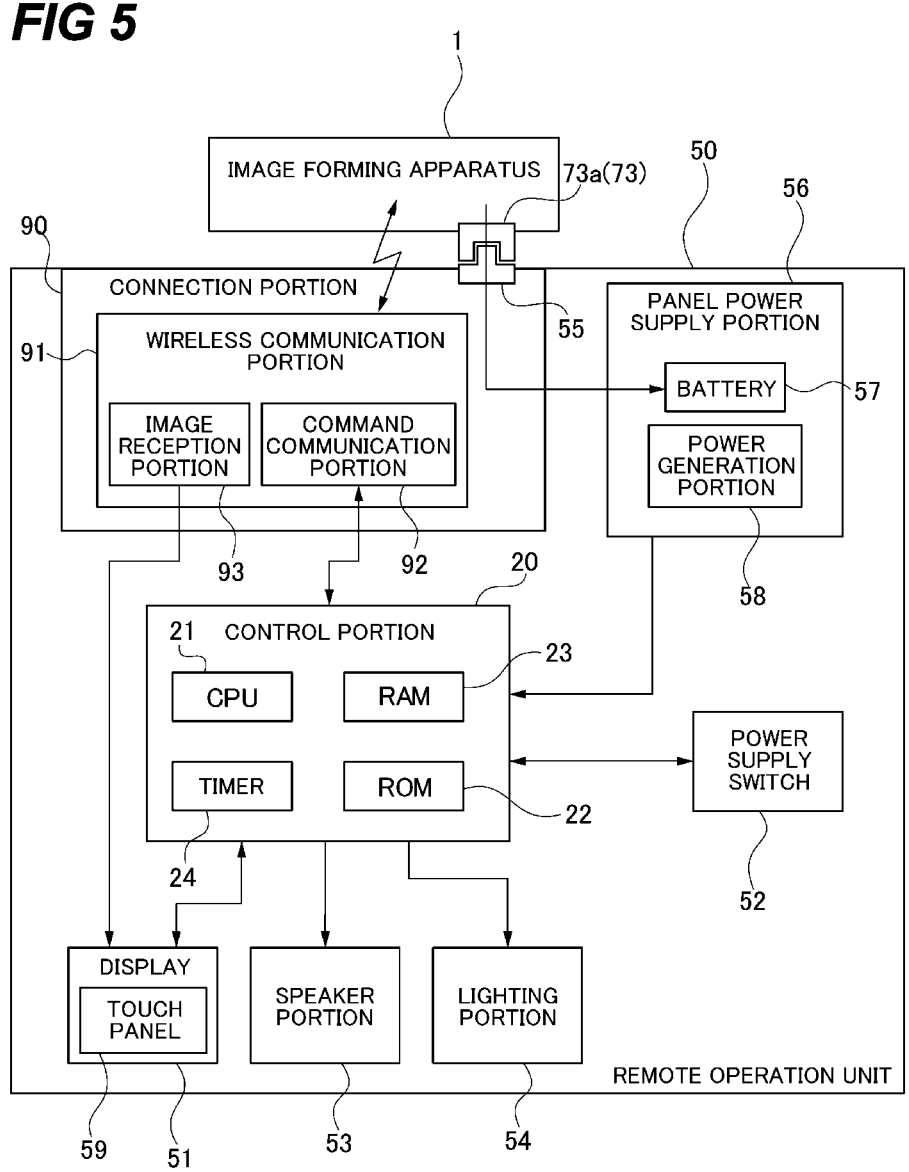
FIG. 5 is a block diagram showing the system configuration of the remote operation unit.

FIG. 5 is a block diagram showing the system configuration of the remote operation unit 50. As shown in FIG. 5, the remote operation unit 50 has the control portion 20. The control portion 20 has the CPU 21, the ROM 22 (second memory portion), the RAM 23 (first memory portion), and the timer 24. The timer 24 keeps time as the control portion 20 performs various processes.

The ROM 22 stores various programs and data related to the control of the remote operation unit 50. The CPU 21 performs various arithmetic operations based on a control program stored in the ROM 22. The RAM 23 temporarily stores data. Namely, based on the control program stored in the ROM 22, the CPU 21 controls the display 51, the speaker portion 53, the lighting portion 54, etc. connected to the control portion 20, while using the RAM 23 as a working area.

The image data sent from the image transmission portion 83 of the image forming apparatus 1 to the image reception portion 93 of the remote operation unit 50 may be temporarily stored in the RAM 23. The CPU 21 may display an image on the display 51 based on these data temporarily stored in the RAM 23. The CPU 21 may also display the image received by the image reception portion 93 on the display 51 without temporarily storing the data of the image in the RAM 23. A moving image about maintenance of the image forming apparatus 1 consists of a plurality of screen images. The image data corresponding to the screen images constituting a moving image may be sent together at once from the image transmission portion 83 of the image forming apparatus 1 to the image reception portion 93 of the remote operation unit 50, and the data of these images may be temporarily stored in the RAM 23. The CPU 21 reads the data of these screen images sequentially from the RAM 23 and displays them on the display 51. In this case, it is not necessary to repeat the procedure of communicating data for one image wirelessly and then displaying a screen on the display 51 based on the data. As a result, when a moving image is displayed, the time required between the reception of the first screen image data and the reception of the last screen image data by the image reception portion 93 becomes shorter. Accordingly, it reduces the risk of an interruption in the middle of a moving image due to unstable communication during the display of the moving image.

The remote operation unit 50 further has the connection portion 90 that makes a connection between the remote operation unit 50 and the image forming apparatus 1. The connection portion 90 has the charging connector 55 connected to the power supply connector 73a of the image forming apparatus 1, and the wireless communication portion 91 (second communication portion) which performs a wireless communication with the image forming apparatus 1.

The wireless communication portion 91 has the command communication portion 92 connected to the CPU 21 and the image reception portion 93 connected to the display 51. The CPU 21 generates instructions and notifications for the image forming apparatus 1 and sends them to the command communication portion 82 of the image forming apparatus 1 via an antenna (not shown) of the command communication portion 92. The command communication portion 92 transmits to the command communication portion 82 of the image forming apparatus 1 data regarding a touch position when the display 51 is touched by a user, which will be described in detail later. The command communication portion 92 transmits to the command communication portion 82 of the image forming equipment 1 a command indicating that a predetermined icon has been touched. The CPU 21 receives instructions and information transmitted from the command communication portion 82 of the image forming apparatus 1 via the command communication portion 92.

The image reception portion 93 receives image data transmitted from the image transmission portion 83 of the image forming apparatus 1 via an antenna (not shown), converts the image data into image data to be displayed on the display 51, and displays the image on the display 51. Although the command communication portion 92 and the image transmission portion 93 are configured separately in this embodiment, they may be integrated using a single communication line.

In this embodiment, the single CPU 21 controls the command communication portion 92 and the image transmission portion 93, but the embodiments are not limited to this configuration. For example, the configuration may be adopted in which CPUs are provided and at least one of them controls the command communication portion 92 and the image transmission portion 93. Further, the command communication portion 92 and the image transmission portion 93 are respectively controlled by different CPUs.

The remote operation unit 50 has the panel power supply portion 56. The panel power supply portion 56 has the battery 57 and the power generation portion 58. The rechargeable battery 57 works as a main power supply for the remote operation portion 50. When the charging connecter 55 is connected to the power supply connector 73a of the image forming apparatus 1, power is supplied from the power supply device 17 of the image forming apparatus 1 to the battery 57 so that the battery 57 is charged. The power generation portion 58 adjusts the voltage of the battery 57 to a voltage of each device of the remote operation unit 50. When the power supply switch 52 is changed from off-state to on-state, the power charged in the battery 57 is supplied to the control portion 20, the display 51, the speaker portion 53, the lighting portion 54, and the connection portion 90 after the voltages for these devices are adjusted.

Wireless Communication between Image Forming Apparatus and Remote Operation Unit Next, a wireless communication between the image forming apparatus 1 and the remote operation unit 50 will be described.

Figure 6:
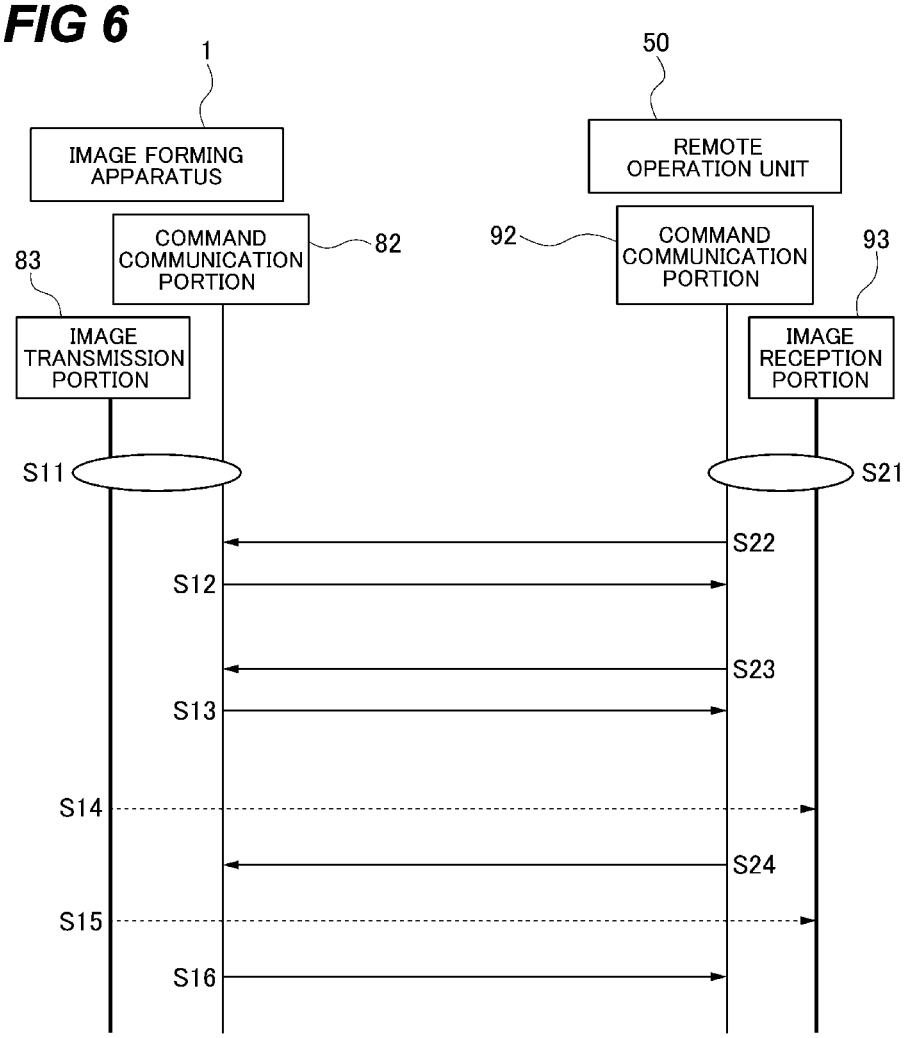
FIG. 6 is a sequence chart showing communication between the image forming apparatus and the remote operation unit.

FIG. 6 is a sequence chart showing communication between the image forming apparatus 1 and the remote operation unit 50. To perform a wireless communication between the image forming apparatus 1 and the remote operation unit 50, a user first activates the image forming apparatus 1 by operating the main power switch 79 (step S11) and activates the remote operation unit 50 by operating the power switch 26 (step S21).

When the remote operation unit 50 is activated, the command communication portion 92 of the remote operation unit 50 sends a negotiation request to the command communication portion 82 of the image forming apparatus 1 (step S22). Next, the command communication portion 82 of the image forming apparatus 1 sends a response signal to the command communication portion 92 of the remote operation unit 50 (step S12). When the remote operation unit 50 receives the response signal, the connection sequence is completed and a wireless communication is established.

Next, the conditions for the wireless communication, such as a communication speed and an image compression rate, are mutually set between the image forming apparatus 1 and the remote operation unit 50 via the command communication portions 82 and 92 (steps S13 and S23). When this setting is completed, the signal of the image (data of the first screen image) stored in the ROM 22 of the image forming apparatus 1 is sent from the image transmission portion 83 of the image forming apparatus 1 to the image reception portion 93 of the remote operation unit 50 in response to the instruction of the CPU 11 of the image forming apparatus 1 (step S14). The CPU 11 may control the image transmission portion 83 such that the image signal is transmitted to the image reception portion 93 after the image signal stored in the ROM 12 is temporarily stored in the RAM 13. In other words, the image forming apparatus 1 may be configured such that the image signal is sent from the ROM 12 to the image reception portion 93 without going through the RAM 13, or the image formation apparatus 1 may be configured such that the image signal is sent from the ROM 12 to the image reception portion 93 through the RAM 13.

Next, the image reception portion 93 of the remote operation unit 50 converts the signal of the received image and displays the image (first screen image) on the display 51. In this case, the CPU 21 may temporarily store the signal of the image received by the image reception portion 93 in the RAM 23. In this case, the CPU 21 reads the signal of the image received by the image reception portion 93 from the RAM 23 and displays the screen image on the display 51.

Then, when a user operates the display 51, the CPU 21 of the remote operation unit 50 sends operation information of the display 51 to the command communication portion 82 of the image forming apparatus 1 via the command communication portion 92 (step S24).

Figure 7:
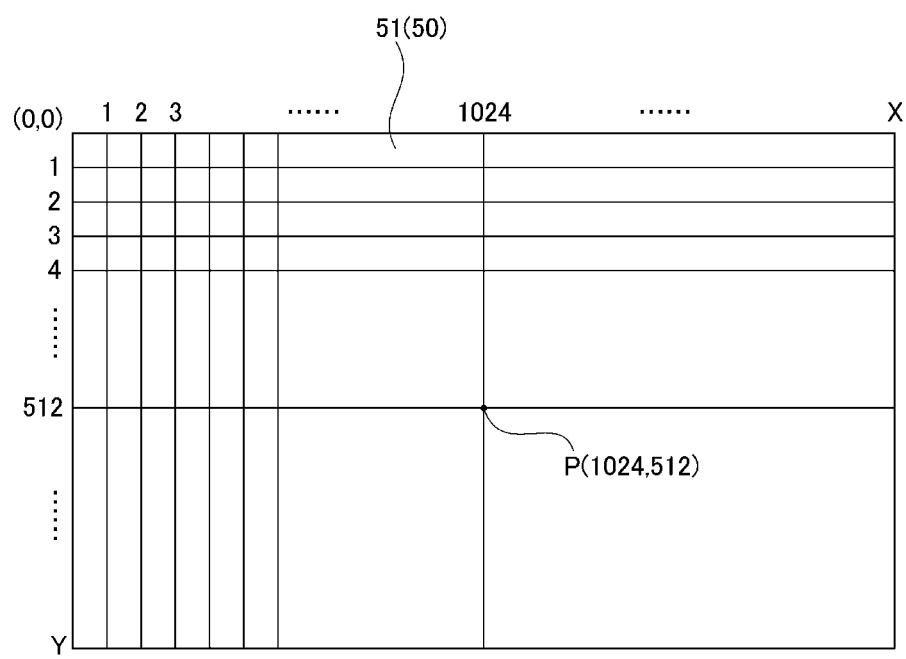
FIG. 7 shows the configuration of the coordinate system on a display of the remote operation unit.

In this case, the CPU 21 transmits the operation information of the display 51 to the image forming apparatus 1 as coordinate information (data representing a position), which will be described in the following. FIG. 7 shows the coordinate system for the display 51 of the remote portion unit 50. As shown in FIG. 7, the display area of the display 51 is divided in the X direction and the Y direction in the coordinate system. The number of divisions depends on the touch panel system, the resistance-type touch panel in this embodiment has 2048 divisions in the X direction and 1024 divisions in the Y direction.

The coordinates are expressed as (X, Y) according to the distance from the origin (0, 0) as a reference point. For example, the position P shown in FIG. 7 is located 1024 in the X direction and 512 in the Y direction away from the origin, and is expressed as coordinates (1024, 512). The coordinate data are sent from the touch panel 59 of the display 51 (touch position detection portion, FIG. 5) to the CPU 21 of the remote operation unit 50, and then transmitted from the command communication portion 92 to the image forming apparatus 1 by the instructions of the CPU 21. In this embodiment, the communication between the image forming apparatus 1 and the remote operation unit 50 is made in 8-bit unit, so that the numerical value of the coordinate data is transmitted after being divided by one eighth. That is, the coordinates (1024, 512) are replaced with (128, 64) and transmitted.

Based on the input coordinate data, the CPU 11 of the image forming apparatus 1 determines which position at which a user has touched the display 51 of the remote operation unit 50. Then, according to the position at which a user touched the display 51, the CPU 11 gives to the remote operation unit 50 instructions such as to transmit image data, to control the lighting of the lighting portion 25, and to turn on or off the sound of the speaker portion 53 (steps S15 and S16). In cases other than the case where operation information of the display 51 is received from the remote operation unit 50, the image forming apparatus 1 gives the instructions described above to the remote operation unit 50 according to the state of the image forming apparatus 1 or the state of the remote operation unit 50.

Figure 8A:
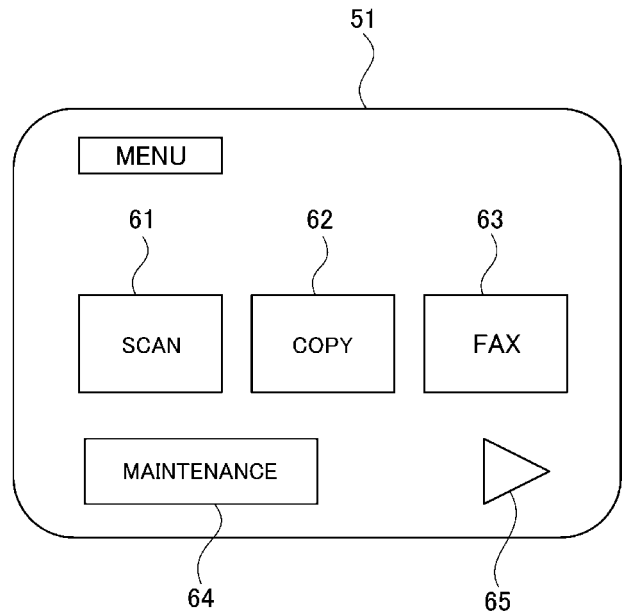
FIGS. 8A and 8B are diagrams each of which shows an example of an image displayed on the display of the remote operation unit.

Next, the transition of images in the case where the display 51 of the remote operation unit 50 is operated will be described using FIGS. 8A, 8B, 9, 10A and 10B. The images shown in these figures are an example of the images displayed on the display 51 of the remote operation unit 50. As shown in FIG. 8A, the operation screen image G1 (see FIG. 9), which is the main menu screen image is displayed on the display 51 of the remote operation unit 50 by default. That is, in the step S14, the data of the operation screen image shown in FIG. 9 (the data of the first screen image) is sent from the image transmission portion 83 to the image reception portion 93. The main menu screen image includes the scan button 61 for performing the setting of the reader 14, the copy button 62 for performing the setting for the image forming unit 15, the fax button 63 for performing the setting for the fax, the maintenance button 64, and the arrow button 65 for switching the screen image to the next page.

Figure 8B:
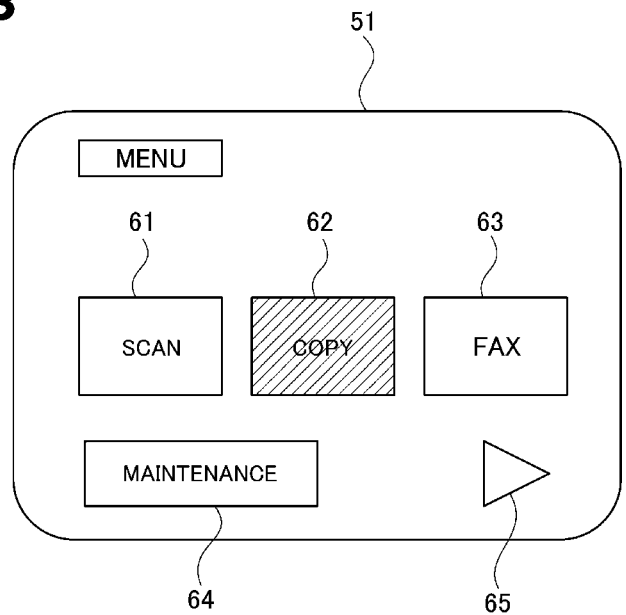

When the CPU 11 of the image forming apparatus 1 judges that a user has selected the copy button 62 (an example of the first icon) from the coordinate data transmitted from the remote operation unit 50, the CPU 11 sends data of a screen image in which the copy button 62 is displayed in gray (data of the screen image indicating that the first icon has been touched) as shown in FIG. 8B to the image reception portion 93 via the image transmission portion 83. As a result, the screen image shown in FIG. 8B is displayed on the display 51 of the remote operation unit 50.

Figure 10A:
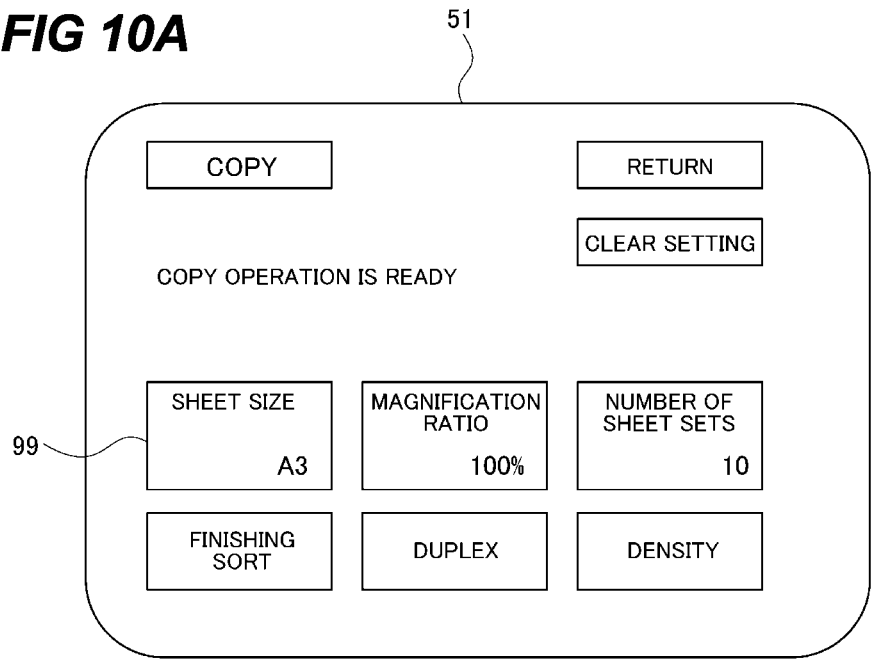
FIGS. 10A and 10B are diagrams for describing how the operation screen images transition.

Next, after a certain period of time has elapsed after the image shown in FIG. 8B had been displayed on the display 51, the CPU 11 of the image forming apparatus 1 sends the image of the copy screen shown in FIG. 10A to the image reception portion 93 via the image transmission portion 83. As a result, the image displayed on the display 51 of the remote operation unit 50 is switched to the image shown in FIG. 10A.

Figure 10B:
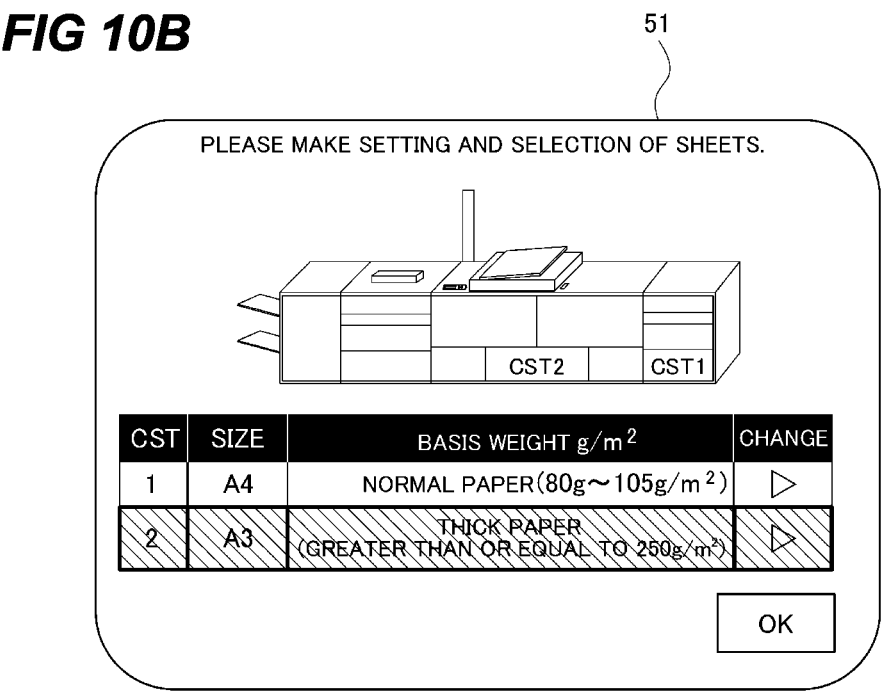

Next, when the CPU 11 of the image forming apparatus 1 judges that a user has selected the paper size button 99 from the coordinate data sent from the remote operation unit 50, the CPU 11 sends data of the image of the paper setting screen shown in FIG. 10B to the image reception portion 93 via the image transmission portion 83. As a result, the image displayed on the display 51 of the remote operation unit 50 is switched to the image shown in FIG. 10B. In the paper setting screen image, the appearance of the image forming apparatus 1, and the sizes and basis weights of the sheets S stored in the sheet cassettes 75*a* and 75*b* are displayed.

The transition of the screen image shown in FIG. 8A to the screen image shown in FIG. 8B is described in more detail. FIG. 9 shows the operation screen image G1 that the image transmission portion 83 of the image forming apparatus 1 transmits to the image reception portion 93 of the remote operation unit 50. The remote operation unit 50 in the first embodiment does not have information on the screen image to be displayed on the display 51. The remote operation unit 50 displays the operation screen image G1 on the display 51 every time the remote operation unit 50 receives the operation screen image G1 from the image forming apparatus 1.

As described above, the remote operation unit 50 transmits the information on the position touched by a user to the image forming apparatus 1 as coordinate data. As shown in the "Coordinate System" in FIG. 9, the remote operation unit 50 keeps the position touched by the user as coordinate data.

The positional relationship between the screen image of the remote operation unit and the coordinate system is shown in FIG. 9. As shown in this figure, the CPU 11 of the image forming apparatus 1 may associate the various buttons (61 to 65) in the operation screen image G1 with the coordinate data by overlapping the respective coordinates with the operation screen image G1. In the example of the main menu screen image in FIG. 9, when the x-coordinate is in the range of 725-1324 and the y-coordinate is in the range of 451-750, the CPU 11 judges that the copy button 62 has been pressed. In other words, it is not necessary for the CPU 21 of the remote operation unit 50 to transmit the information that the copy button has been pressed to the image forming apparatus 1, but it is sufficient to transmit the coordinate data indicating the position touched by a user. Furthermore, the CPU 11 of the image forming apparatus 1 recognizes the image displayed on the display 51 of the remote operation unit 50. Accordingly, based on the coordinate data sent from the remote operation unit 50, the next screen image to be sent to the remote operation unit 50 may be appropriately selected and operations such as performing image formation and scanning may be performed.

Thus, in this embodiment, the image to be displayed on the display 51 of the remote operation unit 50 is stored in the ROM 12 of the image forming apparatus 1, and the image is transmitted from the image forming apparatus 1 to the remote operation unit 50 to display the image on the display 51. By limiting the information to be transmitted from the remote operation unit 50 to the image forming apparatus 1 to "coordinate data (data of position)" in principle, the capacity of the data stored in the ROM 22 may be reduced compared to the configuration in which images are stored in the ROM 22 of the remote operation unit 50. As a result, the capacity of the ROM 22 may be downsized, and the manufacturing cost may be reduced.

Further, the display of the appearance of the image forming apparatus 1 on the display 51 as in the paper setting screen image shown in FIG. 10B suppresses the misrecognition of the positions of the sheet cassettes 75a and 75b, leading to an improvement in usability. When displaying the appearance of the image forming apparatus 1 on the display 51 of the remote operation unit 50 in the configuration where images are stored in the ROM 22 of the remote operation unit 50, it is necessary to change the image data stored in the ROM 22 for each model of the image forming apparatus 1. In contrast, the configuration where the images stored in the ROM 12 of the image forming apparatus 1 is displayed on the display 51 of the remote operation unit 50 does not necessitate a change in image data stored in the ROM 22 for each model of the image forming apparatus 1. Therefore, the remote operation unit 50 may be used among models of the image forming apparatus 1, and the manufacturing cost of the image forming apparatus 1 and the remote operation unit 50 may be reduced.

Second Embodiment

Next, the second embodiment of the image forming apparatus will be described using figures. Only the configuration different from the first embodiment will be described and the parts of the description common with the first embodiment are omitted using the same reference symbols.

The image forming apparatus 1 of this embodiment is configured such that a part of the images to be displayed on the display 51 is stored in the ROM 22 of the remote operation unit 50. Specifically, the image data (data of the second screen image) shown in FIGS. 8A, 8B, and 10A are stored in advance in the ROM 22 of the remote operation unit 50 as images related to the image forming apparatus 1. The CPU 21 controls the display 51 such that an image to be displayed on the display 51 is switched between an image based on the image data stored in the ROM 22 (the second screen image) and an image based on the image data received by the image reception portion 93 (the first screen image). The CPU 21 may temporarily move the image data stored in the ROM 22 to the RAM 23, and then the CPU 21 may read the image data from the RAM 23 and display on the display 51 a screen image according to the image data. Similarly, the CPU 21 may also temporarily move the image data received by the image reception portion 93 to the RAM 23, and then the CPU 21 may read the image data from the RAM 23 and display on the display 51 a screen image according to the image data. In general, the memory area of the RAM 23 is smaller than that of the ROM 22. Therefore, while the second screen image is being displayed on the display 51, the data for the first screen image are not stored in the RAM 23. The rest of the configuration is the same as the that of the configuration of the first embodiment.

FIG. 11 is a sequence chart showing the communication between the image forming apparatus 1 and the remote operation unit 50 in this embodiment. In the following description, the steps similar to those described using FIG. 6 in the first embodiment will be omitted or whose description will be simplified with the same reference symbols. As shown in FIG. 11, a user first activates the image forming apparatus 1 by operating the main power switch 79 (step S11) and activates the remote operation unit 50 by operating the power switch 26 (step S21). When the power switch 26 is turned on and electric power is supplied from the panel power supply portion 56 to the display 51, the display 51 is lit. At this time, the main menu screen image (the second screen image) is first displayed on the display 51. The image data for the main menu screen image at this time is stored in the ROM 22. Namely, the data of the screen image to be displayed on the display 51 at first after the power switch 26 is turned on are stored in the ROM 22. As a result, as compared to the case where the image data is sent from the image forming apparatus 1, the time period from the time when the power switch 26 is turned on to the time when the screen image appears on the display 51 may be shortened. A screen image may be displayed on the display 51 even when the power of the image forming power 1 has not been turned on.

Next, a negotiation request and a response signal are sent and received between the command communication portion 92 of the remote operation unit 50 and the command communication portion 82 of the image forming apparatus 1 (steps S12, S22), thereby establishing a wireless communication between the image forming apparatus 1 and the remote operation unit 50. Thereafter, the conditions for the wireless communication, such as a communication speed and an image compression rate, are mutually set via the command communication portion 92 of the remote operation unit 50 and the command communication portion 82 of the image forming apparatus 1 (steps S13 and S23). When this setting is completed, the CPU 21 of the remote operation unit 50 displays the main menu screen image (operation screen image G1) which is an example of the second screen image shown in FIG. 8A. The main menu screen image is stored in the ROM 22 as an image to be displayed on the display 51. The CPU 21 may temporarily move the data of the second screen image read from the ROM 22 to the RAM 23 and may read the data of the second screen image from the RAM 23.

The main menu screen image does not differ greatly from one image forming apparatus to another. Therefore, even when the remote operation unit 50 is shared by a plurality of image forming apparatuses, the main menu screen image may be used in common. In this way, the exchange of screen image information between the remote operation unit 50 and the image forming apparatus may be reduced, thereby improving the stability of communication. In addition, a user may use a familiar main menu screen image for other image forming apparatuses, thereby improving operability.

Thus, in this embodiment, the image forming apparatus 1 sends the data of the first screen image to the remote operation unit 50, but does not send the data of the second screen image to the remote operation unit 50. In this way, the reduction of the amount of data of the screen image stored in advance in the ROM 22 of the remote operation unit 50 enables smaller capacity of the ROM 22 of the remote operation unit 50, which realizes downsizing and a cost reduction of the remote operation unit 50.

When the display 51 is operated by a user, the CPU 21 of the remote operation unit 50 sends the operation information to the command communication portion 82 of the image forming apparatus 1 via the command communication portion 92 (step S24). In this embodiment, the main menu screen image displayed on the display 51 is an image stored in the ROM 22 of the remote operation unit 50. Therefore, even if the coordinate data are sent to the image forming apparatus 1 as in the first embodiment, the CPU 11 of the image forming apparatus 1 is not capable of recognizing what kind of button is located at the position indicated by the coordinate data. Therefore, in this embodiment, the CPU 21 of the remote operation unit 50 transmits the information corresponding to the button (second icon) selected by a user to the image forming apparatus 1 via the command communication portion 92 as operation information. The "button" referred to here means one of the various icons shown on the display 51, such as "Copy", "Fax", "Start", "Stop", and so on.

The state in which the display 51 is displaying a screen image based on the image data stored in the ROM 22 in advance is referred to as the second mode. The various buttons displayed on the screen in the second mode correspond to the second icons.

Next, the CPU 11 of the image forming apparatus 1 instructs the remote operation unit 50 to control the lighting of the lighting portion 25 and to turn on or off the sound output from the speaker portion 53 according to the operation information of the display 51 input from the remote operation unit 50 (step S16). Even in a case other than the case where the operation information about the display 51 is received from the remote operation unit 50, the image forming apparatus 1 instructs the remote operation unit 50 as described above, according to the state of the image forming apparatus 1 and the state of the remote operation unit 50.

When a user selects the maintenance button 64 in the main menu screen image shown in FIG. 8A, the information corresponding to the maintenance button 64 is sent to the image forming apparatus 1, and the image forming apparatus 1 returns a response to the remote operation unit 50 (steps S51 and S61). When the CPU 21 of the remote operation unit 50 receives a response from the image forming apparatus 1, the CPU 21 switches the control to display the image (first screen image) received by the image reception portion 93 as the image to be displayed on the display 51.

The state in which the display 51 is displaying a screen image based on the image data sent from the image transmission portion 83 to the image reception portion 93 is referred to as the first mode. The various buttons displayed on the display 51 in the first mode correspond to the first icons.

Figure 12:
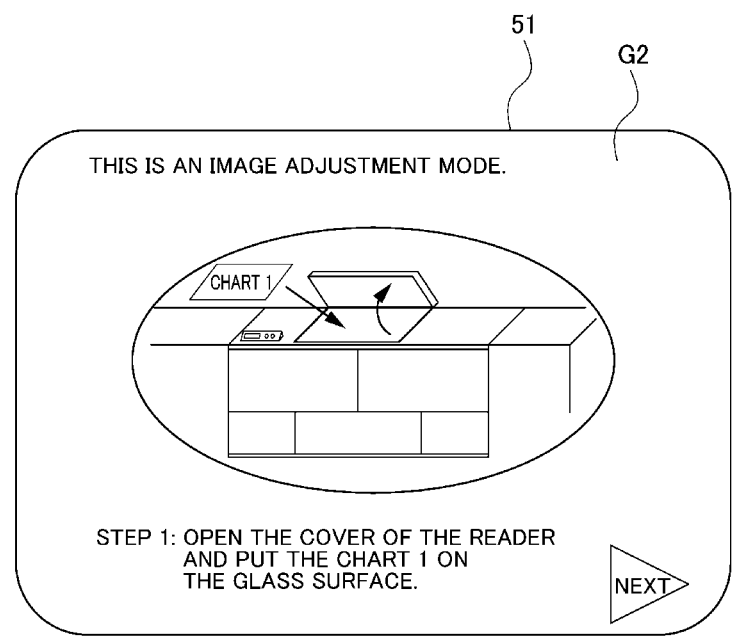
FIG. 12 is a diagram showing an example of an image displayed on the display of the remote operation unit.

In the first mode, the CPU 11 of the image forming apparatus 1 transmits a moving image for maintenance stored in the ROM 12 to the image reception portion 93 of the remote operation unit 50 via the image transmission portion 83 (step S52). FIG. 12 shows the image adjustment screen image G2 (an example of the first screen image) for describing the image adjustment work procedure, which is an example of a moving image for maintenance. As shown in FIG. 12, the image adjustment screen image G2 describes with animation the sequence of operations of opening the cover of the reader 14 and placing the chart paper on the glass surface. A user may place a chart paper on the glass surface according to the image adjustment screen image G2 and may adjust the tint of an image formed by the image forming unit 15. The CPU 21 may temporarily move the data of the first screen image received by the image reception portion 93 to the RAM 23 and then display the first screen image on the display 51. In other words, the remote operation unit 50 may be configured such that the CPU 21 may display the first screen image whose data are received by the image reception portion 93 without going through the RAM 23, or via the RAM 23.

When a user finishes the image adjustment, a message to that effect is sent from the CPU 21 of the remote operation unit 50 to the command communication portion 82 of the image forming apparatus 1 via the command communication portion 92 (step S62). Then, the CPU 11 of the image forming apparatus 1 sends an image switching notification to the command communication portion 92 of the remote operation unit 50 via the command communication portion 82 (step S53). When the CPU 21 of the remote operation unit 50 receives the image switching notification, the CPU 21 switches the control to display the image stored in the ROM 22 as the image to be displayed on the display 51.

If a jam of the sheet S occurs while the image forming apparatus 1 is forming an image, the CPU 21 of the image forming apparatus 1 sends an image switching notification to the remote operation unit 50 via the command communication portion 82 (step S54). When the CPU 21 of the remote operation unit 50 receives the image switching notification, the CPU 21 switches the control to display the image received by the image reception portion 93 as the image to be displayed on the display 51.

Figure 13A:
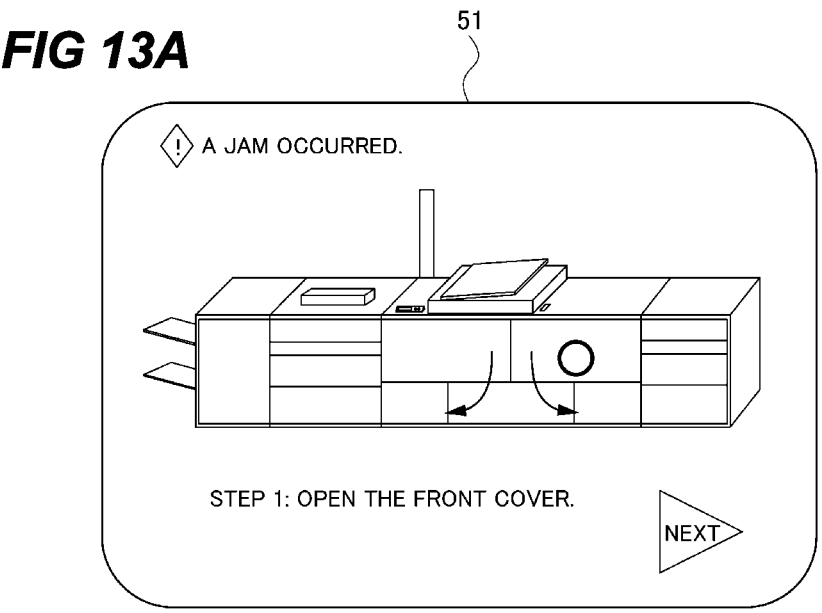
FIGS. 13A and 13B are diagrams each of which shows an example of an image displayed on the display of the remote operation unit.

Next, the CPU 11 of the image forming apparatus 1 transmits, via the image transmission portion 83, the moving image concerning the jam recovery stored in the ROM 12 to the image reception portion 93 of the remote operation unit 50 (step S55). FIG. 13A is a diagram showing the jam recovery screen image G3 (an example of the first screen image), which is an example of a moving image about jam recovery. As shown in FIG. 13A, in the jam recovery screen image G3, the position where the jam occurred and the operations for the jam recovery are described by animation. A user performs the jam recovery according to the jam recovery screen image G3. The CPU 21 may temporarily move the data of the first screen image received by the image reception portion 93 to the RAM 23 and then display the first screen image on the display 51. In other words, the remote operation unit 50 may be configured such that the CPU 21 may display the first screen image whose data are received by the image reception portion 93 without going through the RAM 23, or via the RAM 23.

When a user finishes the jam recovery, a message to that effect is sent from the CPU 21 of the remote operation unit 50 to the command communication portion 82 of the image forming apparatus 1 via the command communication portion 92 (step S63). After that, the CPU 11 of the image forming apparatus 1 sends an image switching notification to the command communication portion 92 of the remote operation unit 50 via the command communication portion 82 (step S56). Accordingly, the CPU 21 of the remote operation unit 50 switches the control to display the image stored in the ROM 22 as the image to be displayed on the display 51.

As described above, in this embodiment, the CPU 21 is capable of switching between the image (the second screen image) stored in the ROM 22 of the remote operation unit 50 and the image transmitted from the image forming apparatus 1 (the first screen image) as the image to be displayed on the display 51 of the remote operation unit 50. In other words, when the remote operation unit 50 is in the first mode, the display 51 displays the first screen image, and when the remote operation unit 50 is in the second mode, the display 51 displays the second screen image. The data of the first screen image may be temporarily moved to the RAM 23 and the data of the first screen image may be read from the RAM 23 in displaying the first screen image on the display 51 of the remote operation unit 50. As described above, the data for the second screen image is stored in the ROM 22 in advance, and the data for the first screen image is not stored in the ROM 22. However, when the data of the first screen image is sent from the image transmission portion 83, the data may be temporarily stored in the RAM 23. It goes without saying that even when the power switch 52 of the remote operation unit 50 is turned off, the data of the second screen image are stored in the ROM 22, but the data of the first screen image are not stored. When the remote operation unit 50 is in the second mode, the data of the first screen image is not stored in the RAM 23.

When the various buttons (first icons) displayed on the first screen image are touched, the wireless communication portion 92 sends the coordinate information (position data) corresponding to the position where the first icon is displayed to the wireless communication portion 82. Even when an area other than the area where the button is displayed, that is, an area where no button is displayed is touched, the coordinate information of the touched area is sent to the wireless communication portion 82. This is to reduce the manufacturing cost by simplifying the design.

Thus, when the first icon is touched on the first screen image, the wireless communication portion 92 does not transmit a command to the wireless communication portion 82 indicating that the first icon has been touched, but only the coordinate information. In this way, the amount of the data used for communication may be reduced, thereby improving communication stability.

When the various buttons (second icons) displayed on the second screen image are touched, the wireless communication portion 92 sends the command corresponding to the second icon to the wireless communication portion 82. For example, if the second icon is the "Copy" icon, the "command" is the data of the command that instructs the image forming apparatus 1 to perform a copy operation. The CPU 11 issues instructions for various operations to units such as the image forming unit 15 in response to the wireless communication portion 82 receiving the command corresponding to the icon.

As described above, in displaying the first screen image and the second screen image on the display 51, the CPU 21 may read the data of the first screen image and the data of the second screen image from the RAM 23. Specifically, the CPU 21 may temporarily move the data of the first screen image received by the image reception portion 93 to the RAM 23, may read the data of the first screen image from the RAM 23, and may display the first screen image on the display 51. The CPU 21 may temporarily move the data of the second screen image stored in advance in the ROM 22 to the RAM 23, may read the data of the second screen image from the RAM 23, and may display the second screen image on the display 51. In this case, both the data for the first screen image and the data for the second screen image will be stored in the RAM 23, but the data for the first screen image is not stored in the ROM 23. As a result, the capacity of the ROM 23 may be reduced compared to the configuration in which both the first screen image data and the second screen image data are stored in the ROM 23. In addition, as compared to the configuration in which the first screen image data and the second screen image data are transmitted from the image transmission portion 83 to the image reception portion 93, the frequency of data communication can be reduced because there is no need to communicate the second screen image data, and the risk of communication failure can be reduced.

With the above configuration, the capacity of data stored in the ROM 22 may be reduced as compared to the configuration in which all images to be displayed on display 51 are stored in the ROM 22 of remote operation unit 50. Therefore, the capacity of the ROM 22 may be downsized, and the manufacturing cost may be reduced.

In addition, as compared to the configuration in which all images to be displayed on the display 51 are stored in the ROM 12, the communication frequency of image data can be reduced, thereby improving communication stability.

Figure 13B:
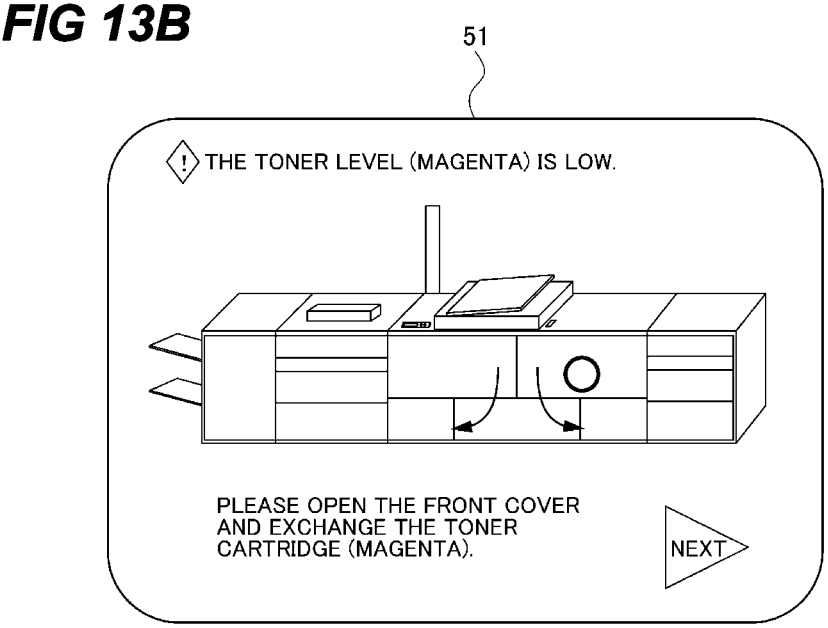

Although this embodiment describes the configuration in which still images are stored in the ROM 22 of the remote operation unit 50 and moving images for jam recovery and image adjustment are transmitted from the image forming apparatus 1 to the remote operation unit 50, the present invention is not limited to this configuration. That is, for example, as shown in FIG. 13B, in the configuration where process cartridges, drum cartridges, toner cartridges, etc., which are replacement units of the image forming apparatus 1, are detachably attached (replaced), the image forming apparatus 1 may be configured such that the image forming apparatus 1 transmit to the remote operation unit 50 a moving image on how to attach and detach these cartridges. A moving image is a collection of multiple still images. Thus, such a moving image is also composed of a collection of multiple second screen images.

The configuration in which a moving image is stored in the ROM 22 of the remote operation unit 50 may be adopted. However, a moving image is composed of multiple still images and have a larger capacity than a single still image. Therefore, the configuration is preferable in which still images are stored in the ROM 22 of the remote operation unit 50 and in which, when a moving image should be displayed on the display 51, the control is switched such that a moving image transmitted from the image forming apparatus 1 is displayed on the display 51.

Third Embodiment

Next, the third embodiment of the image forming apparatus will be described using the figures. Only the configuration different from the first and second embodiments will be described and the parts of the description common with the first and second embodiments are omitted using the same reference symbols.

In this embodiment, a single remote operation unit 50 may be used to operate each of image forming apparatuses 1 by switching a connection destination. The rest of the configuration is the same as that of the image forming apparatus 1 of the first or second embodiment. That is, the configuration of this embodiment may be applied to that of the first and second embodiments.

Figure 14A:
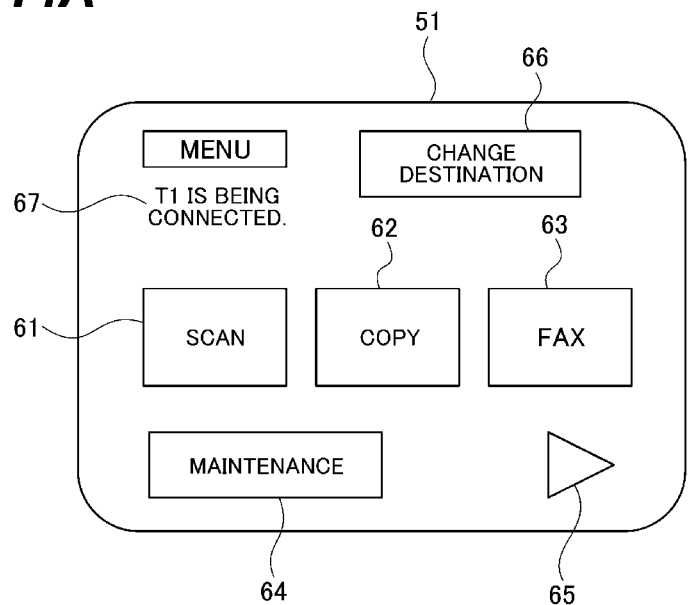
FIGS. 14A and 14B are diagrams each of which shows an example of an image displayed on the display of the remote operation unit.

FIG. 14A shows the main menu screen image displayed on the display 51 of the remote operation unit 50. As shown in FIG. 14A, the main menu screen image has the destination setting button 66 for setting the image forming apparatus 1 to which the remote operation unit 50 is connected, and the destination display portion 67 for displaying a currently connected image forming apparatus 1. Here, the destination display portion 67 indicates that an image forming apparatus 1 with the name "T1" is connected to the remote operation unit 50.

Figure 14B:
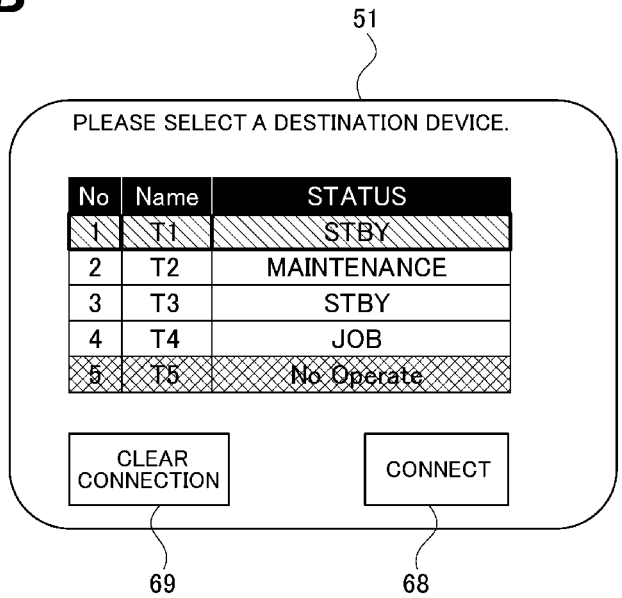

When a user changes a destination image forming apparatus 1 to which the remote operation unit 50 is connected, the user selects the destination setting button 66 on the main menu screen image to display the destination setting screen image shown in FIG. 14B on the display 51. As shown in FIG. 14B, a list of the image forming apparatuses 1 that have been recognized in advance between the remote operation unit 50 and the image forming apparatuses 1 is displayed on the connection destination setting screen image. In this embodiment, five image forming apparatuses 1 with respective names "T1" to "T5" are being recognized by the remote operation unit 50. In addition, the current statuses of the image forming apparatuses 1 displayed in the list are displayed in the connection destination setting screen image. For example, a currently connected image forming apparatus 1 is displayed with hatching, and an image forming apparatus 1 whose power is off is displayed as "No Operate" and is grayed-out.

Figure 15A:
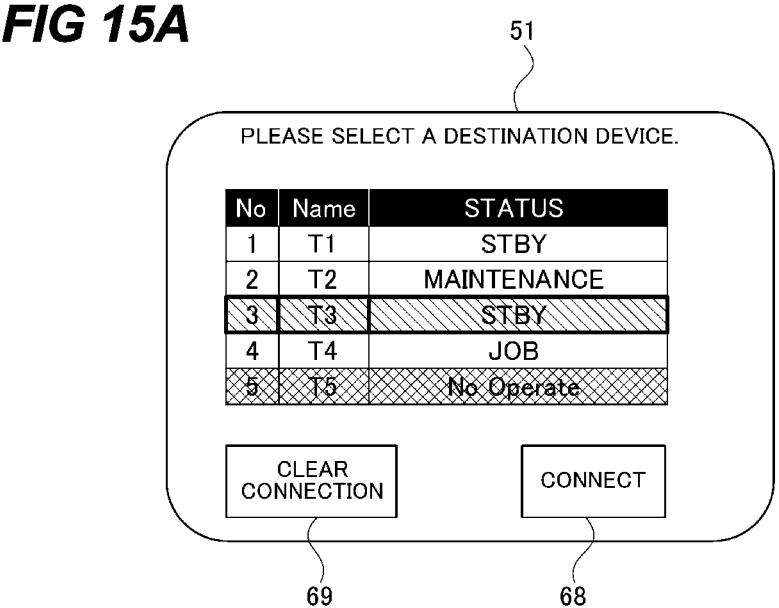
FIGS. 15A and 15B are diagrams each of which shows an example of an image displayed on the display of the remote operation unit.
Figure 15B:
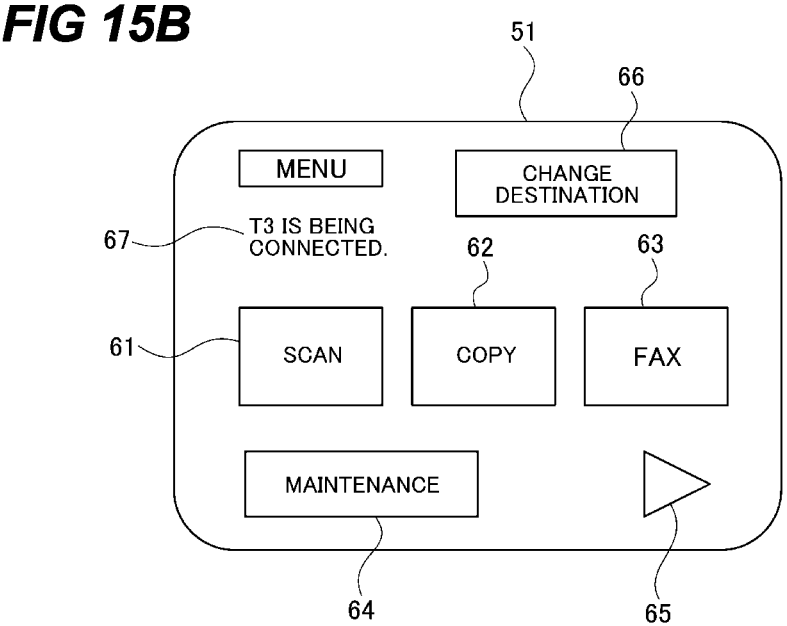

When a user changes a connection destination of the remote operation unit 50, the user selects an image forming apparatus 1 the user wishes to connect by touching it on the destination setting screen image. Here, it is assumed that the image forming apparatus 1 with the name "T3" is touched. As a result, as shown in FIG. 15A, the image forming apparatus 1 with the name "T3" is displayed with hatching in the destination setting screen image, and the hatching for the image forming apparatus 1 with the name "T1", which was previously connected is deleted. When a user selects the connection button 68 in this state, the remote operation unit 50 is connected to the image forming apparatus 1 with the name "T3" as shown in FIG. 15B.

To cancel the connections with all of the image forming apparatuses 1, a user selects the clear connection button 69 in the destination setting screen image shown in FIG. 15A. As a result, all of the connections between the remote operation unit 50 and all of the image forming apparatuses 1 displayed on the destination setting screen image are canceled.

Thus, according to the configuration of this embodiment, a user may operate image forming apparatuses 1 with one remote operation unit 50. Therefore, there is no need for a user to change the remote operation unit 50 when operating image forming apparatuses, thereby improving usability. Also, when the remote operation unit 50 is purchased as an optional device, a user may operate image forming apparatuses by purchasing only one remote operation unit 50, thereby reducing the cost for a user to realize remote operation.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2020-158496, filed Sep. 23, 2020, which is hereby incorporated by reference herein in its entirety.

What is claimed is:

1. An image forming system comprising:
an image forming apparatus configured to form an image on a sheet, the image forming apparatus having a first communication portion; and
a wireless operation unit configured to be able to communicate wirelessly with the first communication portion, the wireless operation unit having a touch panel display configured to be able to display an image and to receive a touch operation by a user,
wherein the wireless operation unit further includes:
a touch position detection portion configured to detect a touch position on the touch panel display by a user;
a first memory portion configured to be able to temporarily store data of a screen image related to an operation screen image for the image forming apparatus, the data of the screen image including data of a first screen image and data of a second screen image;
a second memory portion in which the data of the second screen image are stored in advance; and
a second communication portion configured to communicate wirelessly with the first communication portion,
wherein when the first screen image according to the data of the first screen image transmitted from the first communication portion to the second communication portion is displayed on the touch panel display, in response to a first icon on the first screen image being touched, position data corresponding to a position on which the first icon is displayed are transmitted from the second communication portion to the first communication portion, and
wherein when the second screen image according to the data of the second screen image stored in the second memory portion is displayed on the touch panel display, in response to a second icon on the second screen image being touched, a command corresponding to the second icon is transmitted from the second communication portion to the first communication portion.

2. The image forming system according to claim 1,
wherein the wireless operation unit includes a control portion configured to control the second communication portion,
wherein the control portion is configured to control the second communication portion such that the position data are transmitted to the first communication portion in response to the first icon on the first screen image being touched, and
wherein the control portion is configured to control the second communication portion such that the command is transmitted to the first communication portion in response to the second icon on the second screen image being touched.

3. The image forming system according to claim 1,
wherein the image forming apparatus includes a main memory in which the data of the first screen image are stored.

4. The image forming system according to claim 1,
wherein the first screen image is a screen image for describing recovery procedures for a sheet in a case where the sheet is jammed in the image forming apparatus, and
wherein when the second communication portion receives the data of the first screen image while the second screen image is being displayed on the touch panel display, an image displayed on the touch panel display is changed from the second screen image to the first screen image.

5. The image forming system according to claim 1,
wherein the image forming apparatus includes a detachably attachable toner cartridge configured to accommodate toner,
wherein the first screen image is a screen image for describing operation procedures for attaching and detaching the toner cartridge to and from the image forming apparatus, and
wherein when the second communication portion receives the data of the first screen image while the second screen image is being displayed on the touch panel display, an image displayed on the touch panel display is changed from the second screen image to the first screen image.

6. The image forming system according to claim 1,
wherein the image forming apparatus includes a reading apparatus configured to be able to read a chart paper for adjusting a tint of an image formed on a sheet,
wherein the first screen image is a screen image for describing operation procedures for the reading apparatus to read the chart paper, and
wherein when the second communication portion receives the data of the first screen image while the second screen image is being displayed on the touch panel display, an image displayed on the touch panel display is changed from the second screen image to the first screen image.

7. The image forming system according to claim 1,
wherein with the first screen image being displayed on the touch panel display, even when an area other than an area where the first icon is displayed is touched on the first screen image, position data corresponding to the area other than the area where the first icon is displayed are transmitted from the second communication portion to the first communication portion.

8. The image forming system according to claim 1,
wherein with the first screen image being displayed on the touch panel display, when the position data corresponding to the position on which the first icon is displayed are transmitted from the second communication portion to the first communication portion, screen image data indicating that the first icon has been touched are transmitted from the first communication portion to the second communication portion in response to the first communication portion receiving the position data corresponding to the position on which the first icon is displayed.

9. The image forming system according to claim 1,
wherein the first memory portion is configured to temporarily store the data for the first screen image transmitted from the first communication portion to the second communication portion, and
wherein the first screen image is displayed on the touch panel display according to the data of the first screen image temporarily stored in the first memory portion.

10. The image forming system according to claim 9,
wherein the data of the second screen image which have been stored in the second memory portion are temporarily stored in the first memory portion, and
wherein the second screen image is displayed on the touch panel display according to the data of the second screen image which have been temporarily stored in the first memory portion.

11. The image forming system according to claim 1,
wherein the data of the first screen image are not stored in the first memory portion while the second screen image is being displayed on the touch panel display.

12. A wireless operation unit configured to wirelessly operate an image forming apparatus which forms an image on a sheet, the wireless operation unit comprising:
a touch panel display configured to be able to display an image and to receive a touch operation by a user;
a touch position detection portion configured to detect a touch position on the touch panel display by a user;
a memory portion in which data of a screen image related to an operation screen image for the image forming apparatus; and
a second communication portion configured to communicate wirelessly with a first communication portion of the image forming apparatus,
wherein when a first screen image according to data of the first screen image transmitted from the first communication portion to the second communication portion is displayed on the touch panel display, in response to a first icon on the first screen image being touched, position data corresponding to a position on which the first icon is displayed are transmitted from the second communication portion to the first communication portion, and
wherein when a second screen image according to data of the second screen image stored in the memory portion is displayed on the touch panel display, in response to a second icon on the second screen image being touched, a command corresponding to the second icon is transmitted from the second communication portion to the first communication portion.

13. The wireless operation unit according to claim 12,
wherein the wireless operation unit includes a control portion configured to control the second communication portion,
wherein the control portion is configured to control the second communication portion such that the position data are transmitted to the first communication portion in response to the first icon on the first screen image being touched, and
wherein the control portion is configured to control the second communication portion such that the command is transmitted to the first communication portion in response to the second icon on the second screen image being touched.

14. The wireless operation unit according to claim 12,
wherein the first screen image is a screen image for describing recovery procedures for a sheet in a case where the sheet is jammed in the image forming apparatus, and
wherein when the second communication portion receives the data of the first screen image while the second screen image is being displayed on the touch panel display, an image displayed on the touch panel display is changed from the second screen image to the first screen image.

15. The wireless operation unit according to claim 12,
wherein the image forming apparatus includes a detachably attachable toner cartridge configured to accommodate toner,
wherein the first screen image is a screen image for describing operation procedures for attaching and detaching the toner cartridge to and from the image forming apparatus, and
wherein when the second communication portion receives the data of the first screen image while the second screen image is being displayed on the touch panel display, an image displayed on the touch panel display is changed from the second screen image to the first screen image.

16. The wireless operation unit according to claim 12,
wherein the image forming apparatus includes a reading apparatus configured to be able to read a chart paper for adjusting a tint of an image formed on a sheet,
wherein the first screen image is a screen image for describing operation procedures for the reading apparatus to read the chart paper, and
wherein when the second communication portion receives the data of the first screen image while the second screen image is being displayed on the touch panel display, an image displayed on the touch panel display is changed from the second screen image to the first screen image.

17. The wireless operation unit according to claim 12,
wherein with the first screen image being displayed on the touch panel display, even when an area other than an area where the first icon is displayed is touched on the first screen image, position data corresponding to the area other than the area where the first icon is displayed are transmitted from the second communication portion to the first communication portion.

18. The wireless operation unit according to claim 12,
wherein the memory portion includes a first memory portion and a second memory portion, the first memory portion being configured to be able to temporarily store data of a screen image related to an operation screen image for the image forming apparatus, the data of the second screen image being stored in the second memory portion in advance,
wherein the first memory portion is configured to temporarily store the data for the first screen image transmitted from the first communication portion to the second communication portion, and
wherein the first screen image is displayed on the touch panel display according to the data of the first screen image temporarily stored in the first memory portion.

19. The wireless operation unit according to claim 18,
wherein the data of the second screen image which have been stored in the second memory portion are temporarily stored in the first memory portion, and
wherein the second screen image is displayed on the touch panel display according to the data of the second screen image which have been temporarily stored in the first memory portion.

20. The wireless operation unit according to claim 12,
wherein the memory portion includes a first memory portion and a second memory portion, the first memory portion being configured to be able to temporarily store data of a screen image related to an operation screen image for the image forming apparatus, the data of the second screen image being stored in the second memory portion in advance, and
wherein the data of the first screen image are not stored in the first memory portion while the second screen image is being displayed on the touch panel display.

* * * * *